C. M. CRUM.
AUTOMOBILE HEADLIGHT CONTROL.
APPLICATION FILED OCT. 1, 1912.
1,065,784.
Patented June 24, 1913.
2 SHEETS—SHEET 1.
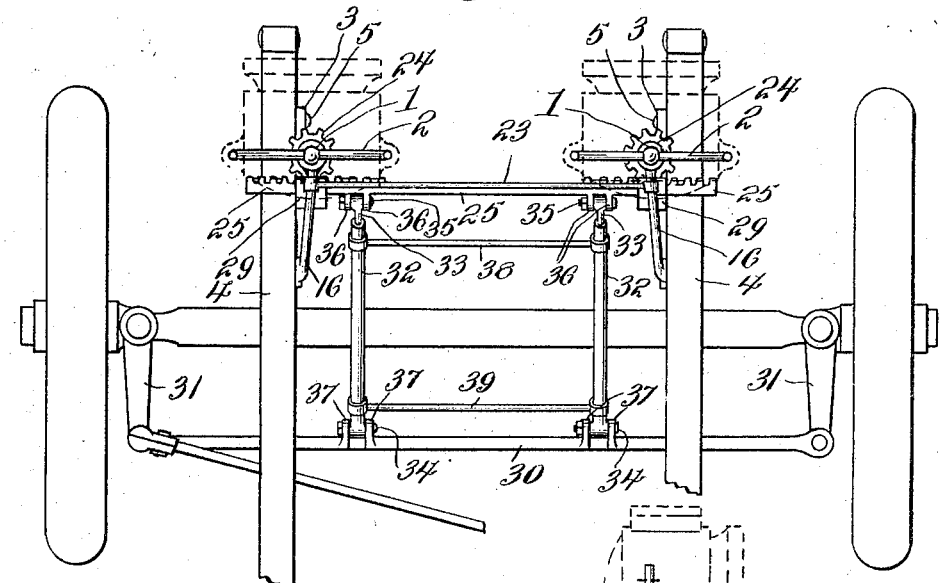
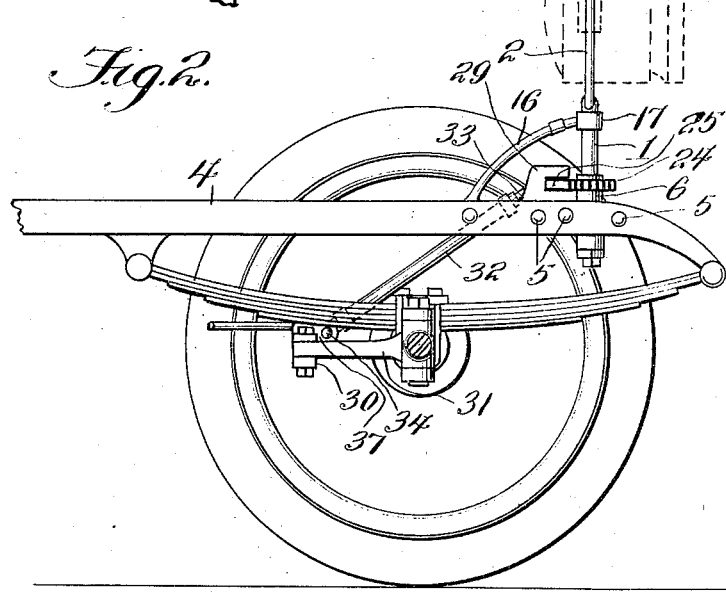
Witnesses
J. T. L. Wright
P. M. Smith
Inventor
Clarence M. Crum,
By Victor J. Evans,
Attorney

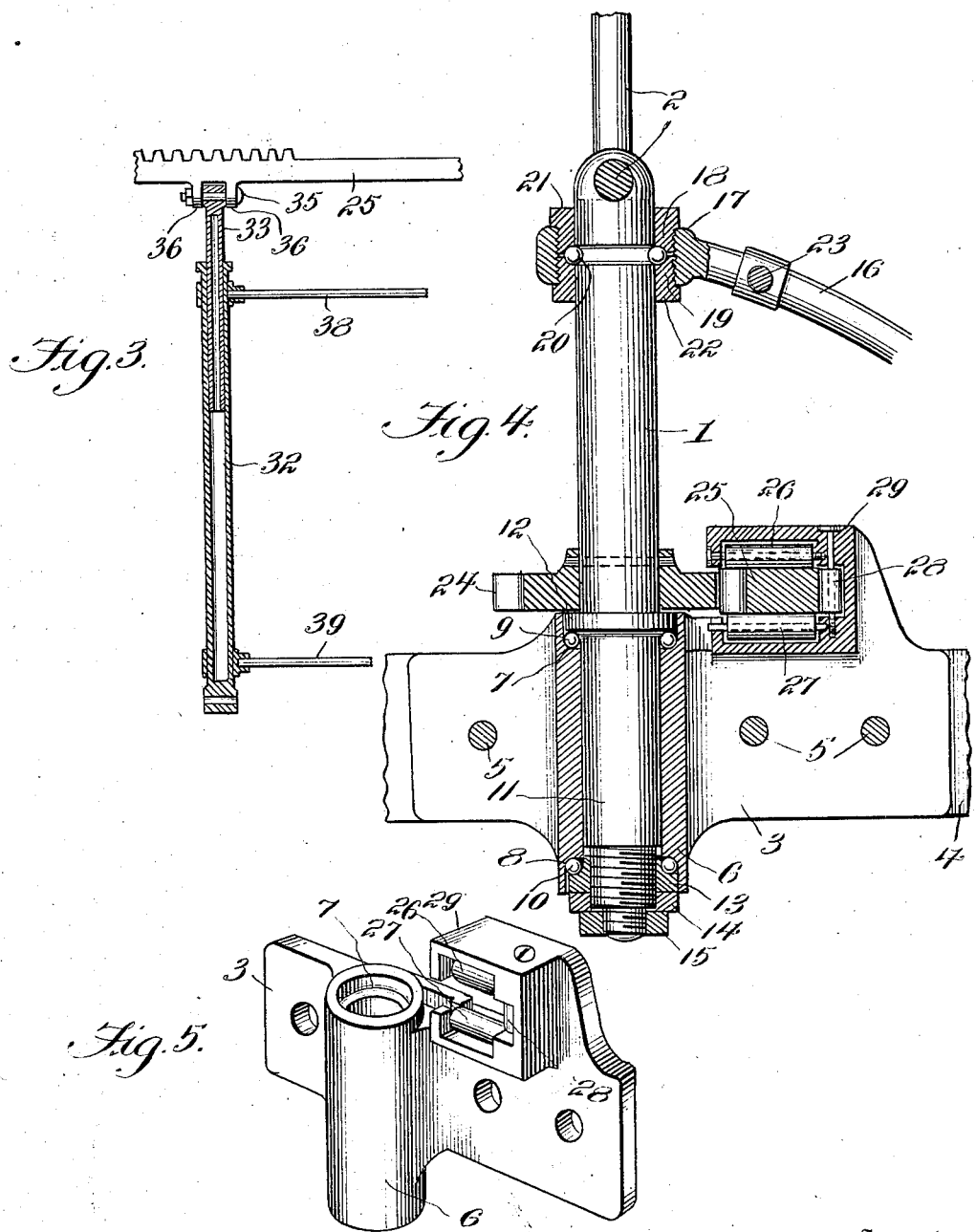

UNITED STATES PATENT OFFICE.

CLARENCE M. CRUM, OF HANNAH, NORTH DAKOTA.

AUTOMOBILE HEADLIGHT CONTROL.

1,065,784. Specification of Letters Patent. Patented June 24, 1913.

Application filed October 1, 1912. Serial No. 723,382.

*To all whom it may concern:*

Be it known that I, CLARENCE M. CRUM, citizen of the United States, residing at Hannah, in the county of Cavalier and State of North Dakota, have invented new and useful Improvements in Automobile Headlight Control, of which the following is a specification.

This invention relates to automatic headlight control, the object in view being to provide a construction and arrangement of headlights for automobiles and the like, by means of which the headlights are turned automatically in accordance with the angle taken by the front steering wheels of the machine, thereby causing the rays of light from the lamps to be directed in the course to be followed by the machine, in accordance with the position of the steering wheels. This insures the illumination of that part of the roadway which is being approached and which is to be traveled over, and is much more satisfactory than the present arrangement, in which the headlights are fastened in fixed position on the frame or chassis of the machine.

A further object of the invention is to provide a construction for the purpose above outlined, which will be economical to produce, and which will not be liable to get out of order.

With the above and other objects in view, the invention consists in the construction, combination and arrangement of parts, as will be hereinafter more fully described, illustrated in the accompanying drawings, and pointed out in the claim hereunto appended.

In the drawings: Figure 1 is a plan view of the front portion of an automobile running gear, showing the invention applied thereto. Fig. 2 is a side elevation of the same. Fig. 3 is a detail sectional view of one of the telescopic connecting bars, showing also a portion of the rack bar and illustrating the connection between the same. Fig. 4 is a vertical section on an enlarged scale taken adjacent to one of the lamp posts, showing the body of the supporting bracket in elevation. Fig. 5 is a detail perspective view of the bracket *per se*.

Referring to the drawings, 1 designates a pair of posts, shown as provided at their upper ends with the forks 2, to which the headlights of the automobile are ordinarily attached. In carrying out this invention, each of the posts 1 is supported and carried by a bracket 3 which is adapted to be secured to the frame or chassis 4 of an automobile by means of bolts 5 or their equivalent. Intermediate its ends, the bracket is provided with a cylindrical extension or sleeve 6, in which the lower portion of the post 1 is journaled. Interiorly, the sleeve 6 is provided at top and bottom with ball cups 7 and 8, against which travel circular series of anti-friction balls 9 and 10, the lower or journal portion 11 of the post 1 is provided with an annular shoulder or bearing cone 12 which rests upon and is supported by the balls 9, while a detachable ball cone 13 is threaded upon the reduced lower end of the journal 11, and secured by means of a nut 14 backed up by a lock nut 15, as shown. This provides for taking up wear in the bearings at the top and bottom of the journal 11 of the post 1.

16 designates a brace extending from each post 1 back to the chassis, to which it is rigidly connected, said brace being provided at its upper and forward end with a ball bearing collar 17, in which are placed ball cones 18 and 19, confining between them a circular series of anti-friction balls 20, the said cones being held in place by nuts 21 and 22. The two braces 16 are connected rigidly together by a tie rod 23 which serves to steady the upper portions of both of the posts 1.

Just above the shoulder 12 of each post 1, a spur gear wheel 24 is mounted fast on the post 1, and meshing with the wheels 24 is a reciprocatory rack bar 25 which travels between upper and lower anti-friction rollers 26 and 27, and is backed up by another anti-friction roller 28 turning on a vertical axis and serving to hold the rack bar 25 in constant mesh with the wheels 24. This also reduces to a minimum the friction on the rack bar, and enables the entire operating mechanism to be actuated without any appreciable increase of burden on the operator at the steering wheel. The rollers 26, 27 and 28 are journaled in an upper L-shaped extension 29 of the bracket 23, said extension and the rollers carried thereby being located in rear of the adjacent gear wheel 24.

30 designates the steering arm connecting rod of an automobile which is pivotally connected, at its ends, to the steering arms 31, this being the usual construction and arrangement. In carrying out this invention, it is necessary to cause the rack bar 25 to move longitudinally in the same direction and simultaneously and equally with the steering arm connecting rod 30. This is accomplished by the movement of a pair of connecting rods 32, each of which is of telescopic construction, as shown in Fig. 3. In other words, each of said connecting rods comprises a hollow or tubular member, to which the reference numeral 32 is applied, and a relatively sliding member 33 which is adapted to slide freely back and forth in the member 32. Each rod is connected, at its rear end, to the steering arm connecting rod 30 by a horizontal pivot or bolt 34, and at its forward end each rod is connected by a horizontal pivot 35 to the rack bar 25, said rack bar being provided with rearwardly extending lugs 36 to receive the pivots 35, while the steering arm connecting rod 30 is similarly provided with forwardly extending lugs 37 to receive the pivots 34.

It will be seen from the foregoing description that by reason of the arrangement of the pivots 34 and 35, provision is made for relative up and down movement between the rack bar and the rod 30, while at the same time the movement of the rod 30 in the direction of its length causes a corresponding movement of the rack bar 25.

In order to compensate for any looseness in the pivots 34 and 35, tie rods 38 and 39 are interposed between the rods 32 and are rigidly connected to the same, thereby forming a practically rigid quadrilateral frame which is interposed between and connects the rack bar 25 and the steering arm connecting rod 30.

When the operator turns the steering wheel, the steering arm connecting rod 30 is moved to one side or the other, according to the direction in which the steering wheel is turned. This causes a corresponding movement of the rack bar 25 in the same direction, causing the partial rotation of the gear wheels 24. As these wheels are fast on the posts 1 of the headlights, the latter are turned in a corresponding direction, and thereby the rays of light are projected in planes parallel to the planes of the steering wheels of the machine, thereby illuminating the roadway in the direction to be taken by the machine.

What is claimed is:

The combination with the steering arm connecting rod of an automobile, of headlights having their supporting shafts journaled to turn on vertical axes, a bar extending parallel to said rod and operatively connected with the lamp shafts, and a quadrilateral connecting frame embodying parallel bars connecting said rod and bar and arranged perpendicular thereto, said parallel bars being longitudinally extensible and being pivotally connected to said rod and bar on horizontal axes to admit of relative up and down movement of said bar and rod, and cross bars rigidly connecting said extensible bars whereby said connecting frame is adapted to effect an equal and simultaneous longitudinal movement of the said bar and rod.

In testimony whereof I affix my signature in presence of two witnesses.

CLARENCE M. CRUM.

Witnesses:
P. L. HINES,
M. J. DIXON.

Copies of this patent may be obtained for five cents each, by addressing the "Commissioner of Patents, Washington, D. C."